(12) United States Patent
Lips

(10) Patent No.: US 11,927,285 B2
(45) Date of Patent: Mar. 12, 2024

(54) CABLE BUSHING

(71) Applicant: Reflex Winkelmann GmbH, Ahlen (DE)

(72) Inventor: Yannick Lips, Beckum (DE)

(73) Assignee: Reflex Winkelmann GmbH, Ahlen (DE)

( * ) Notice: Subject to any disclaimer, the term of this patent is extended or adjusted under 35 U.S.C. 154(b) by 0 days.

(21) Appl. No.: 17/796,909

(22) PCT Filed: Jan. 19, 2021

(86) PCT No.: PCT/EP2021/051038
§ 371 (c)(1),
(2) Date: Aug. 2, 2022

(87) PCT Pub. No.: WO2021/156048
PCT Pub. Date: Aug. 12, 2021

(65) Prior Publication Data
US 2023/0072573 A1    Mar. 9, 2023

(30) Foreign Application Priority Data
Feb. 3, 2020   (DE) .................... 10 2020 102 583.1

(51) Int. Cl.
*F16L 3/10*   (2006.01)
*F16L 3/22*   (2006.01)
*F16L 3/223*  (2006.01)

(52) U.S. Cl.
CPC ................ *F16L 3/10* (2013.01); *F16L 3/222* (2013.01); *F16L 3/223* (2013.01)

(58) Field of Classification Search
CPC ... F16L 3/10; F16L 3/222; F16L 3/223; F16L 5/02; H02G 15/013; H02G 3/085;
(Continued)

(56) References Cited

U.S. PATENT DOCUMENTS

| 4,117,259 A | 9/1978 | Giebel et al. |
| 5,006,669 A * | 4/1991 | Bachel ................ H02G 15/192 |
| | | 174/92 |

(Continued)

FOREIGN PATENT DOCUMENTS

| CH | 608 311 A5 | 12/1978 |
| DE | 60 200 198 T2 | 9/2004 |

(Continued)

OTHER PUBLICATIONS

International Search Report in PCT/EP2021/051038, dated Apr. 22, 2021.

*Primary Examiner* — Christopher Garft
(74) *Attorney, Agent, or Firm* — Collard & Roe, P.C.

(57) ABSTRACT

A cable bushing having a two-part, frame-shaped housing having lower and upper housing parts forming a passage opening in the installed position. An elastic sealing element is inserted into the lower and upper housing parts, respectively. The two sealing elements close the passage opening in the installed position, forming adjacent tubular cable bushing channels. The corresponding cable bushing channel is formed by semi-tubular recesses in the corresponding sealing element. Each sealing element has parallel longitudinal walls, separated from one another by longitudinal grooves, respectively. The innermost longitudinal wall is closed. For forming the corresponding cable bushing channel, the other longitudinal walls have semi-tubular recesses with a decreasing radius from the outermost to the second innermost longitudinal wall. One sealing element has transverse ridges between adjacent cable bushing channels orthogonally to the longitudinal walls. The other sealing element has recesses complementary to the ridges in the longitudinal walls.

9 Claims, 4 Drawing Sheets

Figure 1:
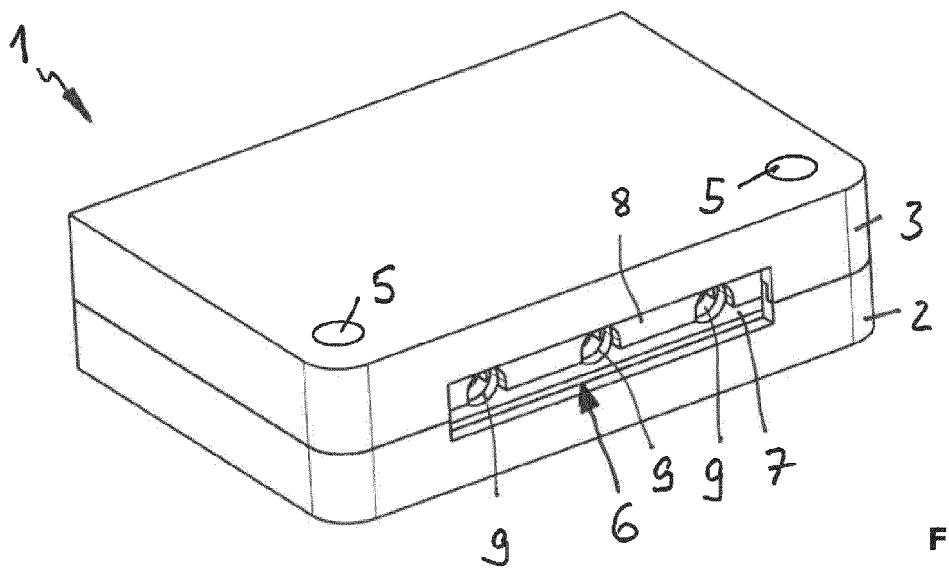

(58) Field of Classification Search
CPC ...... H02G 15/113; H02G 15/18; H02G 15/04;
H02G 15/046; H02G 15/32; H02G 3/088
USPC .......................................................... 248/56
See application file for complete search history.

(56) References Cited

U.S. PATENT DOCUMENTS

| | | | |
|---|---|---|---|
| 5,675,124 A * | 10/1997 | Stough ................ | H02G 15/013 |
| | | | 277/606 |
| 6,280,235 B1 * | 8/2001 | Radliff ................ | H02G 15/007 |
| | | | 439/456 |
| 10,957,470 B2 | 3/2021 | Nowastowski-Stock | |
| 2017/0324229 A1 * | 11/2017 | Nooner ................ | H02G 3/0406 |
| 2019/0319443 A1 | 10/2019 | Claessens | |

FOREIGN PATENT DOCUMENTS

| | | |
|---|---|---|
| DE | 20 2017 002 603 U1 | 8/2018 |
| EP | 2 659 560 B1 | 1/2019 |
| EP | 3 483 996 A1 | 5/2019 |
| WO | 2009/005416 A1 | 1/2009 |
| WO | 2012/088565 A1 | 7/2012 |

* cited by examiner

CABLE BUSHING

CROSS REFERENCE TO RELATED APPLICATIONS

This application is the National Stage of PCT/EP2021/051038 filed on Jan. 19, 2021, which claims priority under 35 U.S.C. § 119 of German Application No. 10 2020 102 583.1 filed on Feb. 3, 2020, the disclosure of which is incorporated by reference. The international application under PCT article 21(2) was not published in English.

The invention relates to a cable bushing.

Cable bushings generally serve to introduce one or more lines, for example cables or also pipe lines or hose lines through an opening in a housing wall of a housing. This housing can be, for example, the housing of a control cabinet or also of devices of any type, into which cables or pipe lines or hose lines are introduced.

An arrangement for a cable wall bushing having a cable bushing is known from EP 3 483 996 A1, which arrangement has a sealing section composed of a soft plastic component, which section has an opening in the longitudinal direction, for holding a cable that passes through a housing wall, in a sealed manner, a strain relief mechanism composed of a hard plastic component, which is formed onto the sealing section in one piece and has a passage, in the longitudinal direction, for the cable to be passed through, which passage aligns with the opening, and a slit that extends in the longitudinal direction of the cable bushing over the sealing section and the strain relief mechanism, and through which the cable to be passed through can be introduced from the outside, into the opening and the passage, from a direction transverse to the longitudinal direction. This arrangement therefore has two different regions composed of different materials, namely a sealing section and a strain relief mechanism, wherein the sealing section can have multiple sealing lips that are arranged one behind the other in the axial direction. This known arrangement is therefore relatively complicated.

A cable bushing having a basic frame and having at least one cable bushing module provided with one or more passage opening(s) for a corresponding cable, the outside dimensions of which are adapted to the inside cross-section of the basic frame, and which module can be arranged in the inside cross-section of the basic frame, and having at least one holding part that can be attached to the basic frame, by means of which part the cable bushing module can be fixed in place in the basic frame, is known from DE 20 2017 002 603 U1. In this regard, it is provided that the at least one holding part attached to the basic frame can be moved back and forth between a holding position in which it fixes the cable bushing module in place in the basic frame and at least one release position in which the cable bushing module can be removed from the basic frame and introduced into the basic frame. Furthermore, a further cable bushing is known from WO 2009/005416 A1.

It is the task of the invention to create a universally usable, reliably sealing cable bushing having the most compact structure possible.

This task is accomplished with a cable bushing having the characteristics of claim 1.

The cable bushing according to the invention therefore has a lower housing part and an upper housing part, into which a sealing element composed of an elastic material is introduced, in each instance, wherein the sealing elements make multiple cable bushing channels available, which, on the basis of their embodiment viewed in the axial introduction direction, form multiple sealing regions, one behind the other, having a reduced cross-section from the outside to the inside, so that the corresponding cable bushing channel is suitable for sealing off different cable diameters. In this regard, the two sealing elements engage into the corresponding longitudinal grooves with their corresponding longitudinal walls, in the manner of a tongue and groove, so that a corresponding press-down pressure is applied, and based on the inner longitudinal wall, which is closed, in each instance, strain relief for protection against unintentional pulling out is guaranteed at the same time. By means of the transverse ridges in one sealing element and the related complementary recesses in the other sealing element, each cable bushing channel forms a closed chamber, and this further increases the sealing effect.

In a preferred embodiment, it is provided that the width of the corresponding longitudinal groove between adjacent longitudinal walls approximately corresponds to the wall thickness of the longitudinal walls. As a result, the two sealing elements engage into one another with shape fit, to a great extent, and this promotes both the sealing effect and the strain relief effect.

In a further advantageous embodiment, it is provided that in the installed position, the longitudinal walls engage into the related longitudinal groove of the one sealing element or the other.

In this regard, it is particularly advantageous that stops for the longitudinal walls of the one sealing element are formed in the longitudinal grooves of the other sealing element. As a result, the reciprocal penetration depth of the longitudinal walls is limited in a defined manner, so as to prevent undesirable deformations of the sealing elements.

Furthermore, it is provided that the one sealing element has transverse walls parallel to the transverse ridges on the two outer sides, which walls surround the other sealing element on the outside in the installed position.

In the case of this previously mentioned embodiment, the other sealing element preferably has bottom ridges on the outside, so that seen in a top view, the two sealing elements align with one another on the outside.

Furthermore, it is provided that the other sealing element has a bottom ridge on the outside, bordering on the innermost longitudinal wall, and it is furthermore preferred that the one sealing element has a bottom ridge on the outside, bordering on the outermost longitudinal wall. By means of these embodiment alignments in the installed position, the longitudinal edges of the two sealing elements also align with one another.

In order to be able to exert a defined press-down pressure on the two sealing elements, it is preferably provided that the lower housing part and the upper housing part can be screwed together.

Depending on the installation situation, the cable bushing can be attached by means of fastening the lower housing part and the upper housing part to a further housing. Alternatively, however, it can be provided that the lower housing part or the upper housing part is an integral component of a further housing, i.e. one of the two housing parts is then integrated directly into a further housing, in one piece.

Figure 3:
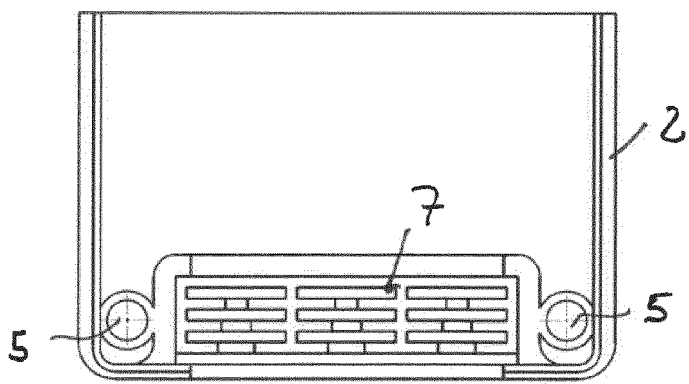
Figure 4:
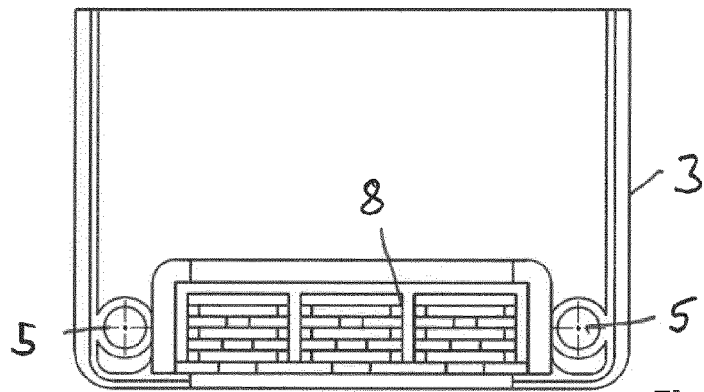
Figure 5:
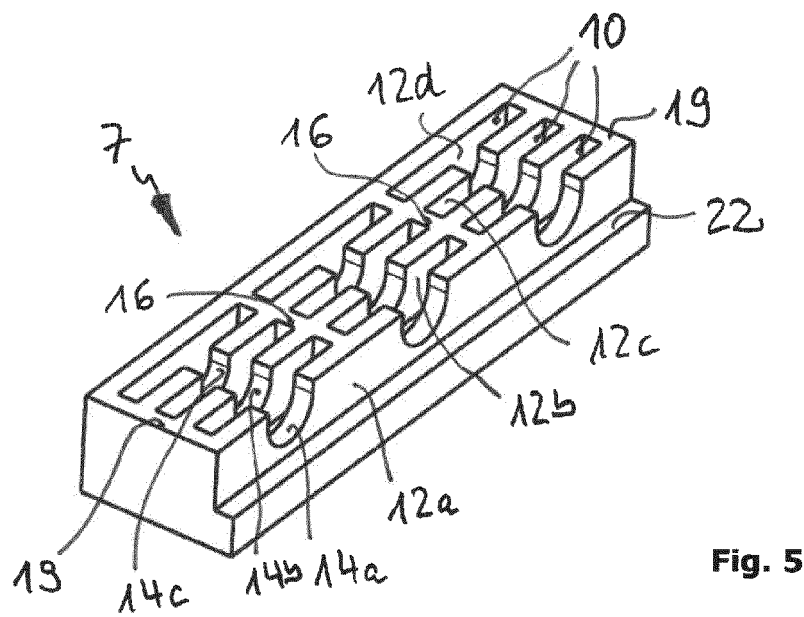
Figure 6:
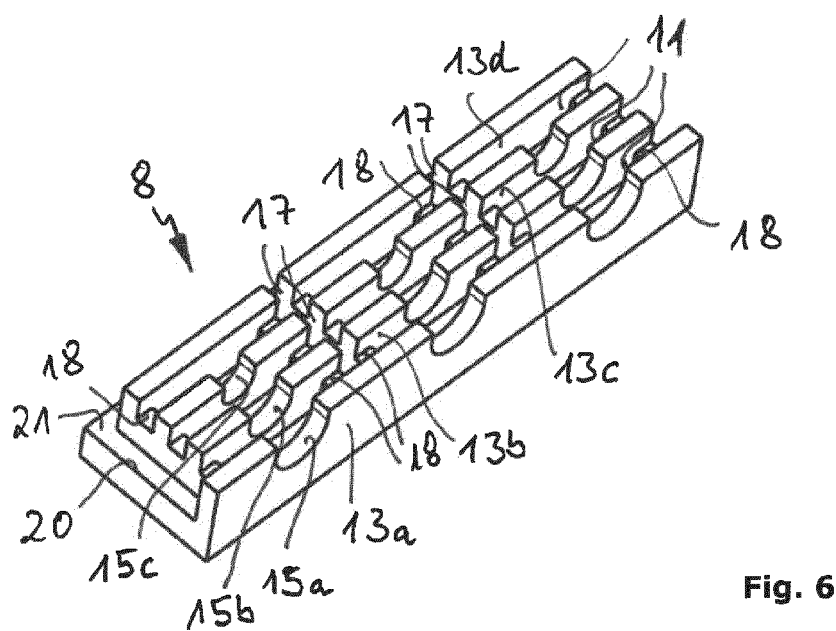
Figure 7:
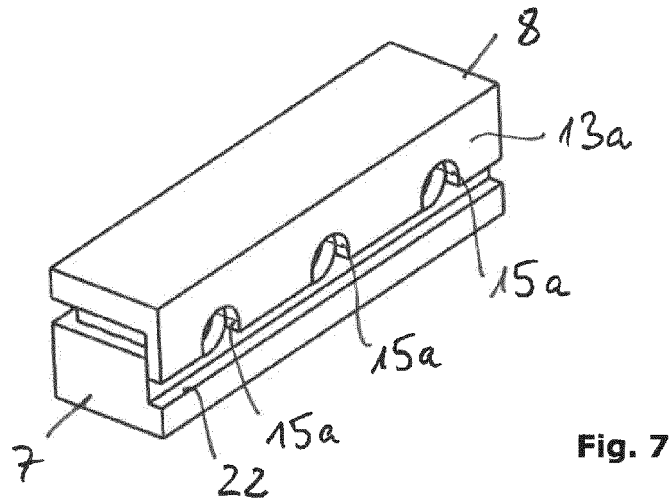
Figure 8:
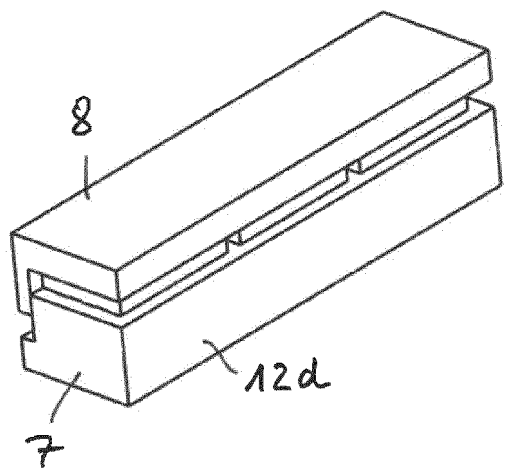
Figure 9:
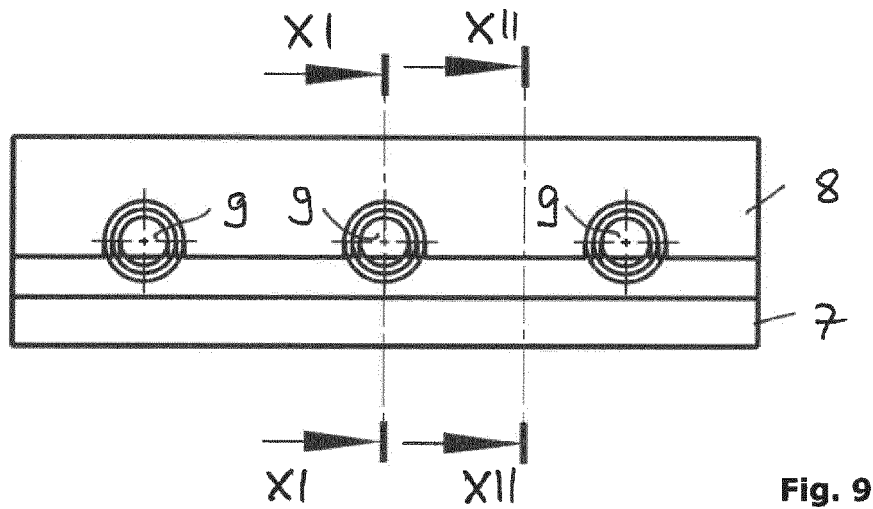
Figure 10:
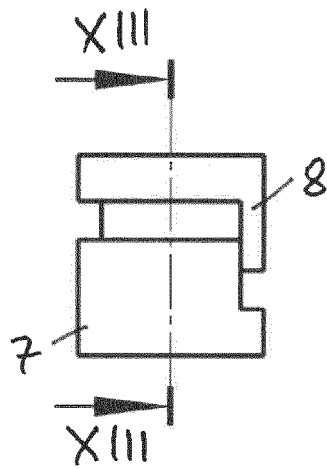
Figure 11:
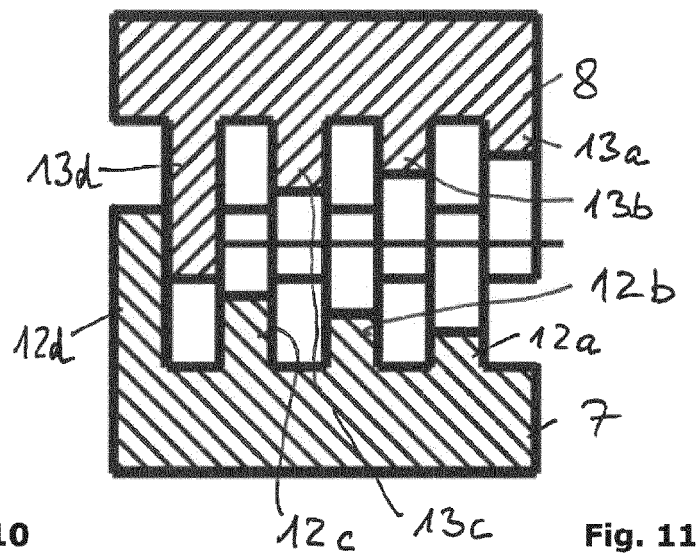
Figure 12:
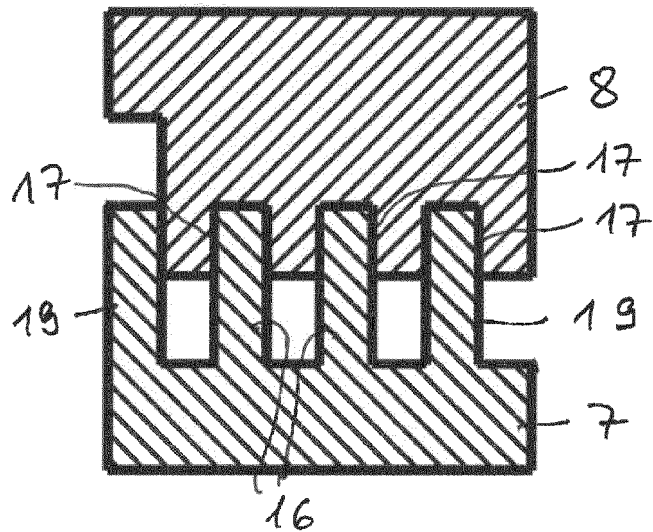

The invention will be explained in greater detail below, using the drawing as an example. The drawing shows, in FIG. 1 a perspective representation of a cable bushing in the installed position, FIG. 2 a perspective representation of the cable bushing according to FIG. 1 with an introduced cable, FIG. 3 a view of a lower housing part of the cable bushing with a sealing element set into it, FIG. 4 a view of an upper housing part of the cable bushing with a sealing element set into it, FIG. 5 a perspective representation of a lower sealing element, FIG. 6 a perspective representation of an upper sealing element, FIG. 7 a perspective representation of the two sealing elements in the installed position, from the front, FIG. 8 a perspective representation of the two sealing elements in the installed position, from the rear, FIG. 9 a front view of the two sealing elements in the installed position, FIG. 10 a side view of the two sealing elements in the installed position, FIG. 11 a section according to the line XI-XI in FIG. 9, FIG. 12 a section according to the line XII-XII in FIG. 9, and FIG. 13 a section according to the line XIII-XIII in FIG. 10.

Figure 2:
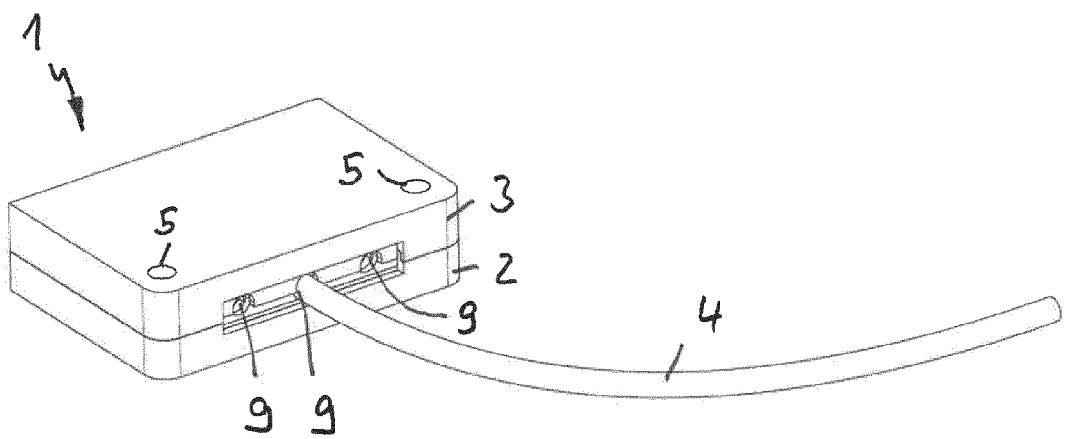

A cable bushing is indicated in general with 1 in FIGS. 1 and 2. In the exemplary embodiment shown, this cable bushing 1 has a two-part frame-type housing having a lower housing part 2 and an upper housing part 3. This housing 1 can be attached to a further housing, not shown, for example of a device, a control cabinet or the like, in the region of an opening, so as to be able to introduce a line 4 into this further housing, in the manner described below.

Alternatively, it can also be provided that either the lower housing part 2 or the upper housing part 3 is an integral component of a further housing that is not shown. The lower housing part 2 and the upper housing part 3 can be releasably connected with one another in a suitable manner; symbolically, two bores 5 are shown, in each instance, on the lower housing part 2 and on the upper housing part 3, into which bores fastening screws, not shown, can be screwed.

In the assembled installed position shown, the lower housing part 2 and the upper housing part 3 form a passage opening 6, through which one or more cables 4 can get through the housing 1 or, depending on the embodiment of the housing 1, only into the interior region of the housing 1.

A sealing element is inserted into the lower housing part 2 and the upper housing part 3, in each instance, preferably with shape fit, namely a lower sealing element 7 and an upper sealing element 8. The two sealing elements 7, 8 close off the passage opening 6 in the installed position, in the manner to be explained in greater detail below, forming adjacent tubular cable bushing channels 9. In the exemplary embodiment, three cable bushing channels 9 are provided parallel to one another and at a distance from one another.

Each sealing element 7, 8 has multiple parallel longitudinal walls 12a, 12b, 12c, 12d (lower sealing element 7) and 13a, 13b, 13c, 13d (upper sealing element 8), each spaced apart from one another by means of longitudinal grooves 10,11. The innermost longitudinal wall 12d, 13d, in each instance, is configured to be closed, in this regard, i.e. as a continuous wall, while the other longitudinal walls 12a, 12b, 12c; 13a, 13b, 13c have semi-tubular recesses 14a, 14b, 14c; 15a, 15b, 15c for forming the corresponding cable bushing channel 9, which recesses have a radius that decreases from the outermost longitudinal wall 12a, 13a to the second innermost longitudinal wall 12c, 13c. In this regard, the recesses 14a, 15a as well as the recesses 14b, 15b and the recesses 14c, 15c each have the same radius, so that in the installed position, the semi-tubular recesses of the lower sealing element 7 and of the upper sealing element 8 that are assigned to one another, in each instance, complement one another to form a tubular shape, even if they are arranged one behind the other in the installed position, viewed in the introduction direction.

In the exemplary embodiment shown, it is thereby guaranteed that in the case of suitable coordination of the radii of the semi-tubular recesses 14a to 14c and 15a to 15c with the outside diameters of the cables 4, the cable bushing 1 is suitable for passing through and sealing off lines 4 that have three different radii. In this regard, the corresponding cable 4, depending on its outside radius, lies against and is sealed off either by the recesses 14a, 15a or the recesses 14b, 15b or 14c, 15c.

Transverse ridges 16 are formed between adjacent cable bushing channels 9 in the lower sealing element 7, at a right angle to the longitudinal walls 12a to 12d, and recesses 17 complementary to the ridges are formed in the other upper sealing element 8, in the longitudinal walls 13a to 13d.

The width of the corresponding longitudinal groove 10, 11 between adjacent longitudinal walls 12a to 12d or 13a to 13d approximately corresponds to the wall thickness of the longitudinal walls 12a to 12d or 13a to 13d, so that it is possible to introduce the longitudinal walls of one sealing element 7 or 8 into the longitudinal grooves 10 or 11 in the manner of a tongue and groove in the installed position, in certain regions. During this process, the transverse ridges 16 also engage into the complementary recesses 17, in certain regions, and this has the result that in the installed position, every cable bushing 9 is configured as a closed sealing chamber.

In this regard, stops 18 for the longitudinal walls 12a to 12c of the lower sealing element 7 are formed in the longitudinal grooves 11 of the upper sealing element 8.

In order to obtain a sealing body having a circumferentially closed outside contour in the assembled installation position, seen in a top view, which body is formed by the two sealing elements 7 and 8, the lower sealing element 7 has transverse walls 19 parallel to the transverse ridges 16, on both outer sides, which walls enclose the upper sealing element 8 on the outside in the installed position. The upper sealing element 8 has bottom ridges 20 on the outside, and a bottom ridge 21 on the outside, bordering on the innermost longitudinal wall 13d. Finally, the lower sealing element 7 has a bottom ridge 22 on the outside, bordering on the outermost longitudinal wall 12a.

The lower sealing element 7 is inserted into the lower housing part 2, and the upper sealing element 8 is inserted into the upper housing part 3, preferably with shape fit, for which purpose the lower housing part 2 and the upper housing part 3 are formed correspondingly on the inside. The lower housing part 2 and the upper housing part 3 are configured to retain their shape, and can consist, for example, of plastic or also of metal; the lower sealing element 7 and the upper sealing element 8, in contrast, consists of a sealing elastic material, for example soft plastic.

In order to insert or pass through a line 4, which can be, for example, a cable, a pipe line, a hose line or the like, the lower housing part 2 and the upper housing part 3 are separated from one another and the line, depending on its spatial arrangement, is laid into the lower housing part 2 or the upper housing part 3, and accordingly into the lower sealing element 7 or the upper sealing element 8. In this regard, depending on the outside radius of the cable 4, it lies tightly against one of the recesses 14a to 14c or 15a to 15c. Subsequently the lower housing part 2 is set onto the upper housing part 3 or vice versa, and thereby the two sealing elements 7, 8 engage into one another in the manner of a tongue and groove. This situation can best be seen in FIG. 11. In this regard, not only do the longitudinal walls 12a to 12d or 13a to 13d engage into the longitudinal grooves 10 or 11, but also the transverse ridges 16 and the transverse walls 19 engage into the recesses 17, as is evident from FIG. 12. As a result, each tubular cable bushing channel 9 is configured as a closed sealing chamber.

Figure 13:
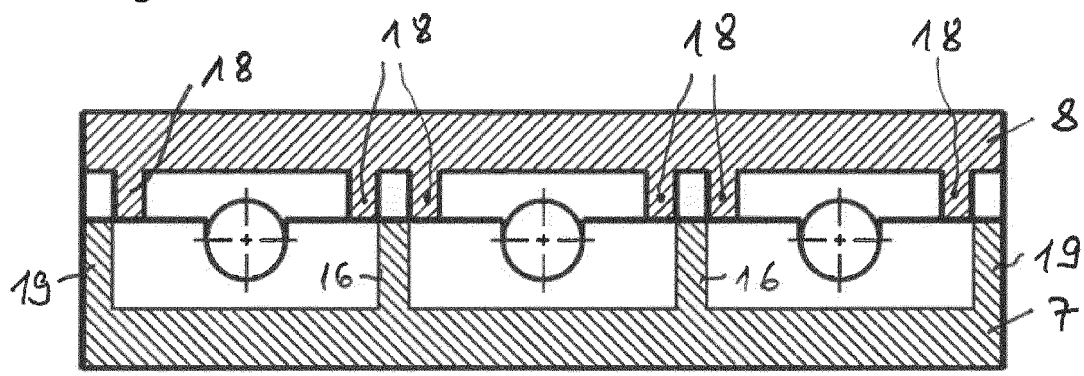

In this regard, the engagement of the two sealing elements 7, 8 into one another is limited by the stops 18, as can best be seen in FIG. 13.

Of course the invention is not restricted to the exemplary embodiments shown. Further embodiments are possible without departing from the basic idea. For example, the cable bushing 1 can also have a different number of cable bushing channels 9, and the corresponding sealing element 7, 8 can fundamentally also have more than three semi-tubular recesses, if the cable bushing 1 is supposed to be suitable for more than three different cable sizes.

| Reference Symbol List: | |
|---|---|
| 1 | cable bushing |
| 2 | lower housing part |
| 3 | upper housing part |
| 4 | cable |
| 5 | bore |
| 6 | passage opening |
| 7 | lower sealing element |
| 8 | upper sealing element |
| 9 | cable bushing channel |
| 10 | longitudinal groove |
| 11 | longitudinal groove |
| 12a, 12b, 12c, 12d | longitudinal wall |
| 13a, 13b, 13c, 13d | longitudinal wall |
| 14a, 14b, 14c | recess |
| 15a, 15b, 15c | recess |
| 16 | transverse ridge |
| 17 | recess |
| 18 | stop |
| 19 | transverse wall |
| 20 | bottom ridge |
| 21 | bottom ridge |
| 22 | bottom ridge |

The invention claimed is:

1. A cable bushing having a two-part, frame-shaped housing, which has a lower housing part and an upper housing part, which parts form a passage opening in an installed position,
   wherein a first sealing element composed of an elastic material is inserted into the lower housing part and a second sealing element composed of an elastic material is inserted into the upper housing part,
   wherein the first and second sealing elements close off the passage opening in the installed position, forming adjacent tubular cable bushing channels, which, viewed in an axial introduction direction, form multiple sealing regions, one behind the other, having a reduced cross-section from an outside to an inside, so that a corresponding cable bushing channel formed by semi-tubular recesses in a corresponding sealing element is suitable for sealing off different cable diameters,
   wherein each sealing element has multiple parallel longitudinal walls, spaced apart from one another by means of longitudinal grooves, extending transverse to the introduction direction, in each instance,
   wherein an innermost longitudinal wall, seen in the introduction direction, is closed off, and for forming the corresponding cable bushing channel, the other longitudinal walls have semi-tubular recesses that have a decreasing radius from an outermost to a second innermost longitudinal wall,
   wherein transverse ridges are formed between adjacent cable bushing channels in one sealing element, at a right angle to the longitudinal walls and having a height that is equal to the height of the longitudinal walls, and recesses that are complementary to the ridges are formed in the longitudinal walls in the other sealing element, the transverse ridges in the installed position engaging into the recesses,
   wherein in the installed position, the longitudinal walls engage partially into the corresponding longitudinal groove of the one sealing element or the other.

2. The cable bushing according to claim 1, wherein a width of the corresponding longitudinal groove between adjacent longitudinal walls approximately corresponds to a wall thickness of the longitudinal walls.

3. The cable bushing according to claim 1, wherein stops for the longitudinal walls of the one sealing element are formed in the longitudinal grooves of the other sealing element.

4. The cable bushing according to claim 1, wherein the one sealing element has transverse walls parallel to the transverse ridges on both outer sides, which walls enclose the other sealing element on the outside, in the installed position.

5. The cable bushing according to claim 4, wherein the other sealing element has bottom ridges on an outside of the other sealing element, which abut the transverse walls in the installed position.

6. The cable bushing according to claim 1, wherein the other sealing element has a bottom ridge, directed parallel to the innermost longitudinal wall, on an outside of the other sealing element, bordering on the innermost longitudinal wall.

7. The cable bushing according to claim 1, wherein the one sealing element has a bottom ridge, directed parallel to the outermost longitudinal wall, on an outside of the one sealing element, bordering on the outermost longitudinal wall.

8. The cable bushing according to claim 1, wherein the lower housing part and the upper housing part can be screwed together.

9. The cable bushing according to claim 1, wherein the lower housing part or the upper housing part is an integral component of a further housing.

\* \* \* \* \*